(12) United States Patent
Carpenter

(10) Patent No.: US 6,205,222 B1
(45) Date of Patent: Mar. 20, 2001

(54) CLAMPING DEVICE FOR HANDHELD ELECTRONIC DEVICES

(75) Inventor: W. Kevin Carpenter, Durham, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/271,051

(22) Filed: Mar. 17, 1999

(51) Int. Cl.$^7$ .................................................. H04M 1/00
(52) U.S. Cl. ........................... 379/446; 379/455; 379/454
(58) Field of Search ................................... 379/433, 426, 379/446, 455, 454; 224/930

(56) References Cited

U.S. PATENT DOCUMENTS 5,253,292  * 10/1993  Fluder et al. ........................ 379/446
5,475,752    12/1995  Mischenko ........................... 379/433

* cited by examiner

Primary Examiner—Jack Chiang
(74) Attorney, Agent, or Firm—Myers Bigel Sibley & Sajovec

(57) ABSTRACT

Clamping devices are provided with increased clamping force to firmly attach electronic devices to various objects. Clamping devices include a base, such as an electronic device housing, and a clip hinged to the base. The clip is pivotable, relative to the base, along a path of rotation between a closed position and an open position. An extension spring is configured to continuously urge the clip towards the closed position when the clip is positioned between an intermediate point along the path of rotation and the closed position, and to continuously urge the clip towards the open position when the clip is positioned between the intermediate point and the open position.

24 Claims, 5 Drawing Sheets

VECTOR DIAGRAM

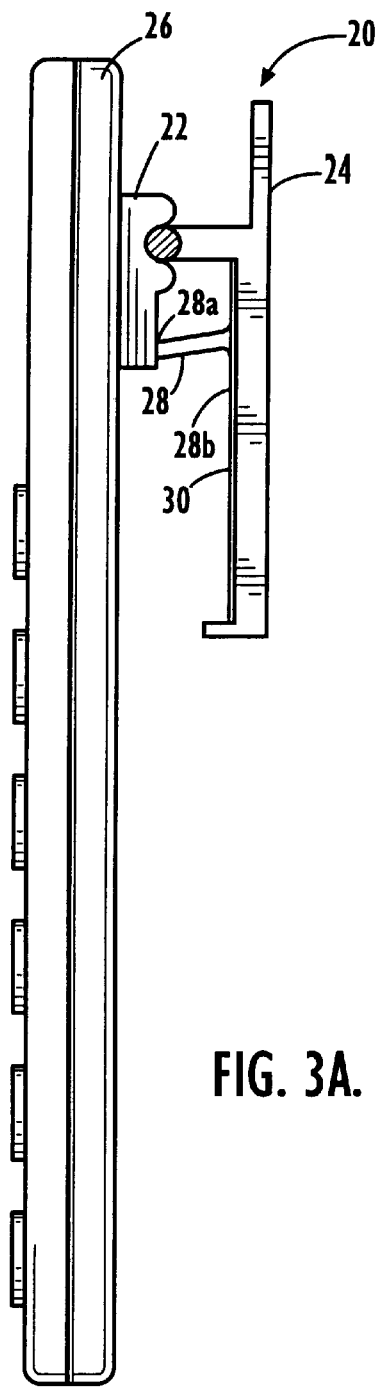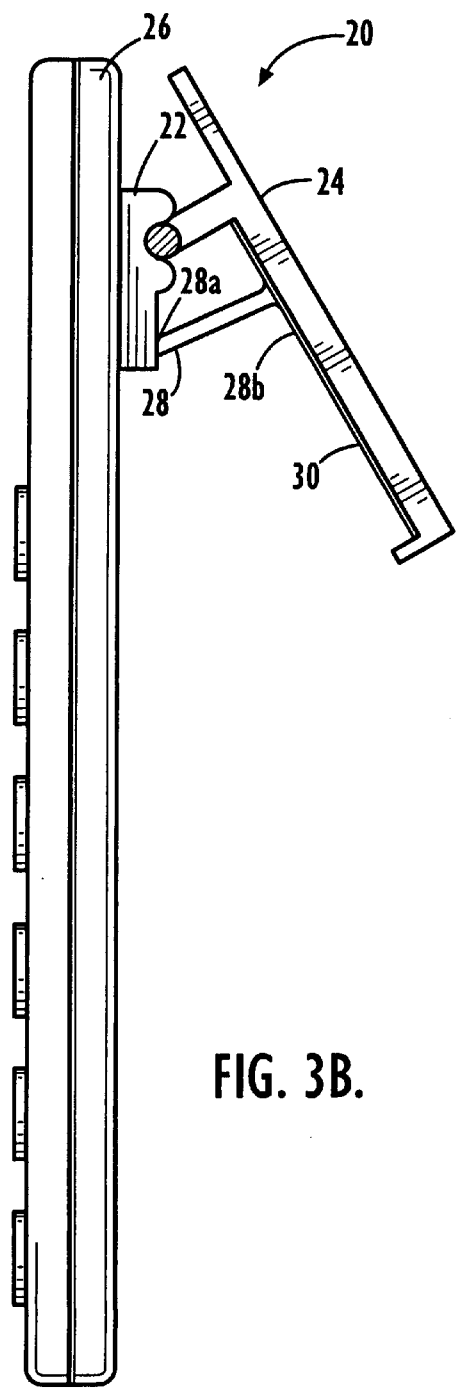
FIG. 3A.
FIG. 3B.

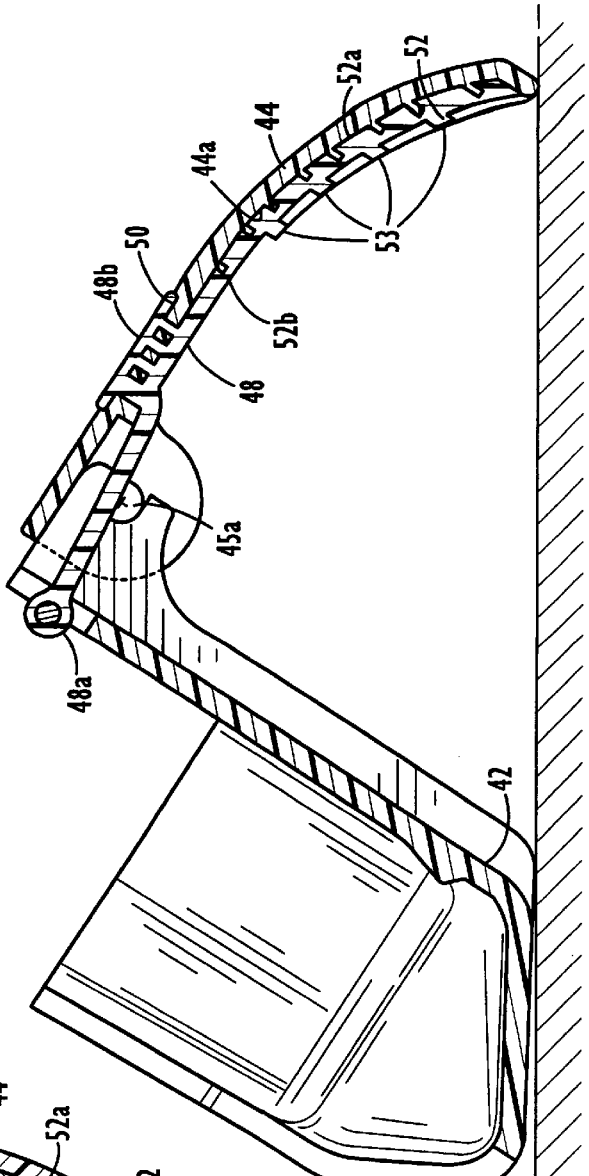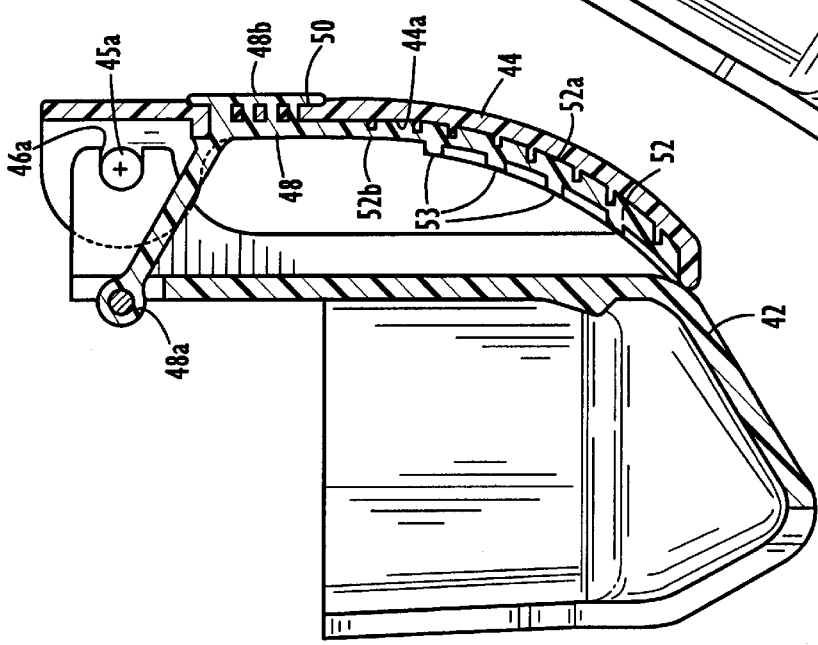

CLAMPING DEVICE FOR HANDHELD ELECTRONIC DEVICES

FIELD OF THE INVENTION

The present invention relates generally to electronic devices and, more particularly, to devices for attaching electronic devices to persons and objects.

BACKGROUND OF THE INVENTION

Portable telecommunications devices, such as radiotelephones (e.g., cellular telephones), have become increasingly popular for both personal and commercial use. With their increase in popularity, radiotelephones have also been undergoing miniaturization to facilitate storage and portability. Indeed, some contemporary radiotelephone models are only 11–12 centimeters in length. As a result of the decreasing size of radiotelephones, spring-loaded clips have been employed to attach radiotelephones to the clothing of users.

Increasingly, radiotelephone users want to attach their radiotelephones to various objects, including belts, pockets, waistbands of pants and skirts, purse straps, notebooks, and the like. A high clamping force is desired to ensure that radiotelephones clamped to such objects cannot become easily unattached therefrom.

Unfortunately, the clamping force of conventional spring-loaded clips may be inadequate to prevent radiotelephones from being accidentally dislodged and thereby damaged as a result of being dropped. Conventional spring-loaded clips typically utilize a "clothes pin"-style design. In order to overcome the spring force when removing or securing a clip of this type to a belt or other article of clothing, a user squeezes a pair of finger pads that act as levers that open the clip. The force that a user can comfortably exert between his/her thumb and forefinger in order to squeeze these finger pads in order to overcome the spring force can be somewhat limited. As a result, to facilitate user operation, springs with inadequate force to securely attach a radiotelephone to an object are often utilized.

Supporting clips can add to the cost of radiotelephone manufacture. In addition, supporting clips can be somewhat bulky and obtrusive and thereby hinder miniaturization efforts. Accordingly, there is a need for an attachment device that can securely attach a radiotelephone to various objects, yet be easily manipulated by users. Furthermore, there is a need for an attachment device that is cost-effective to manufacture and that does not impede miniaturization.

Increasingly, handheld radiotelephones are being equipped with features once reserved for desktop telephones. For example, radiotelephones are being equipped with speaker phone features that allow "hands-free" operation. Accordingly, there is a need to support radiotelephones on a desktop or other surface to facilitate hands-free operation.

SUMMARY OF THE INVENTION

In view of the above, it is an object of the present invention to provide devices for attaching handheld radiotelephones and other portable electronic devices to various objects that can be easily manipulated by users yet have sufficient force to resist accidental detachment.

It is another object of the present invention to provide devices that can support radiotelephones for hands-free operation.

It is another object of the present invention to facilitate reduction in costs associated with radiotelephone manufacturing.

These and other objects of the present invention are provided by a clamping device with increased clamping force for firmly attaching an electronic device to various objects, wherein the electronic device to which the clamping device is utilized can be used as a lever for disengaging the clamping device from an object. A clamping device, according to an embodiment of the present invention, includes a base, such as an electronic device housing, and a clip hinged to the base. The clip is pivotable, relative to the base, along a path of rotation between a closed position and an open position.

In a closed position, the clip is in overlying, adjacent relationship with the base. In an open position, the clip is disposed at an angle relative to the base. An extension spring, such as an elastic member, includes opposite ends that are secured to the base and clip, respectively. The extension spring is configured to continuously urge the clip towards the closed position when the clip is positioned between an intermediate point along the path of rotation and the closed position, and to continuously urge the clip towards the open position when the clip is positioned between the intermediate point and the open position. When in the open position, the clip can support an electronic device on a surface to facilitate hands-free operation.

To remove the clamping device from an article of clothing or other object, a user rotates the electronic device with which the clamping device is utilized away from the user's body or the object using the length of the electronic device as a lever arm. By using the electronic device in this manner, a user can obtain a mechanical advantage sufficient to overcome the force of the extension spring. Accordingly, higher spring forces can be utilized with the present invention as compared with conventional attachment devices.

According to another embodiment of the present invention, a clamping device may include an extension spring that is integrally formed with a clip. Furthermore, an extension spring may include a surface with raised portions formed therein that are configured to frictionally engage an object to which the clamping device is attached.

The present invention is advantageous because clamping devices with strong clamping forces can be utilized to secure electronic devices to clothing or to various objects. In addition, a clamping device according to the present invention may also be utilized to facilitate hands-free operation of an electronic device. By integrally forming an extension spring with a clip, according to another embodiment of the present invention, time and costs associated with the manufacturing of electronic devices, such as radiotelephones, may be reduced.

BRIEF DESCRIPTION OF THE DRAWINGS

FIG. 3A illustrates a clamping device according to another embodiment of the present invention wherein an extension spring is integrally formed with a clip and wherein the clip is in a closed position.

FIG. 3B illustrates the clamping device of FIG. 3A wherein the clip is in a closed position.

FIG. 5 is a cross-sectional view of the clamping device of FIG. 4 taken along lines 5—5.

FIG. 6 illustrates the clamping device of FIG. 4 with the spring-loaded clip in an open position.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1B:
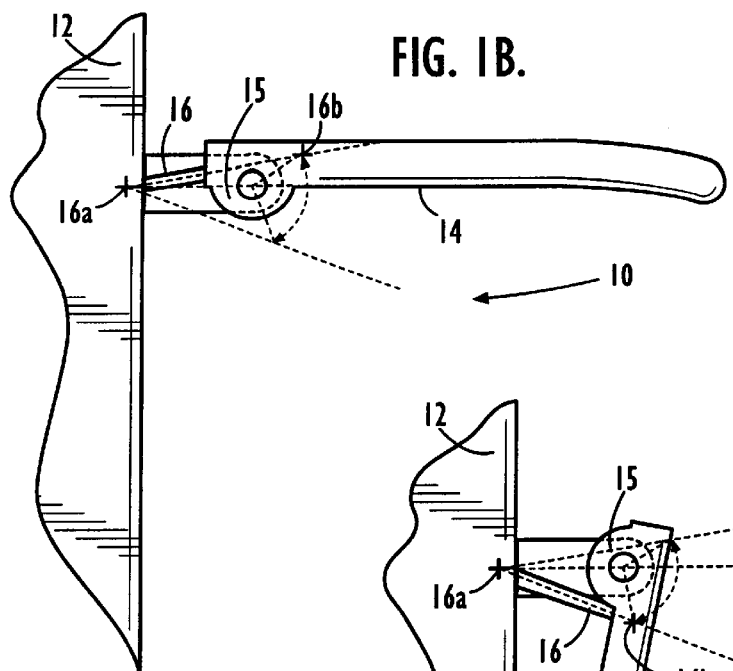
FIG. 1B illustrates the clamping apparatus of FIG. 1A with the spring-loaded clip in an open position.
Figure 1A:
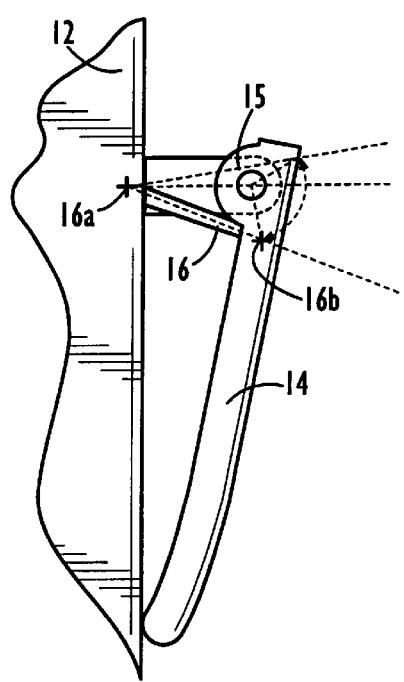
FIG. 1A illustrates a clamping device for supporting a portable electronic device, such as a radiotelephone, according to an embodiment of the present invention, wherein the clamping device includes a spring-loaded clip in a closed position.

Referring now to FIGS. 1A–1B, a clamping device 10 according to one embodiment of the present invention for attaching a portable electronic device, such as a radiotelephone, to various objects is illustrated. The illustrated clamping device 10 includes a base 12 and a spring-loaded clip 14 hinged to the base via hinge 15 and pivotable, relative thereto, along a path of rotation between a closed position (FIG. 1A) and an open position (FIG. 1B). Various types and configurations of hinges may be utilized in accordance with the present invention, and need not be described further herein.

When in the closed position (FIG. 1A), the clip 14 is in overlying, adjacent relationship with the base 12, as illustrated. In the closed position, the spring-loaded clip is configured to firmly grip an object, such as a belt, placed between the clip 14 and the base 12. When in the open position (FIG. 1B), the clip 14 is disposed and maintained at an angle, relative to the base, as illustrated.

A spring 16 is coupled to the base 12 and clip 14 and is configured to constantly maintain tension on the clip 14. Depending on the position of the clip 14 relative to the path of rotation, the spring 16 is configured to urge or bias the clip 14 towards either the closed or open position. The spring 16 continuously urges the clip 14 towards the closed position when the clip 14 is positioned between an intermediate point (M, FIG. 2) along the path of rotation (P, FIG. 2) and the closed position. The spring 16 continuously urges the clip 14 towards the open position when the clip 14 is positioned between the intermediate point (M, FIG. 2) and the open position.

Preferably, the spring 16 is an extension spring formed from an elastic material. However, it is understood that the present invention is not limited to springs formed from elastic material. Various types and configurations of extension springs may be utilized with the present invention without limitation.

In a preferred embodiment, the spring 16 is is an elongated, elastic member formed from elastomeric materials such as synthetic rubber, natural rubber, and polyester. A particularly preferred elastomeric material is a segmented aromatic polyester such as Hytrel 4069 from E. I. du Pont de Nemours and Company, Wilmington, Del. As illustrated in FIGS. 1A and 1B, a first end portion 16a of the spring 16 is secured to the base 12 and an opposite second end portion 16b is secured to the clip 14. As will be described below, either or both of the first and second end portions 16a, 16b of the spring 16 may be integrally formed with the base 12 and/or clip 14. For example, either or both of the first and second end portions 16a, 16b of the spring 16 may be co-molded with the base 12 and/or clip 14, respectively.

Figure 2:
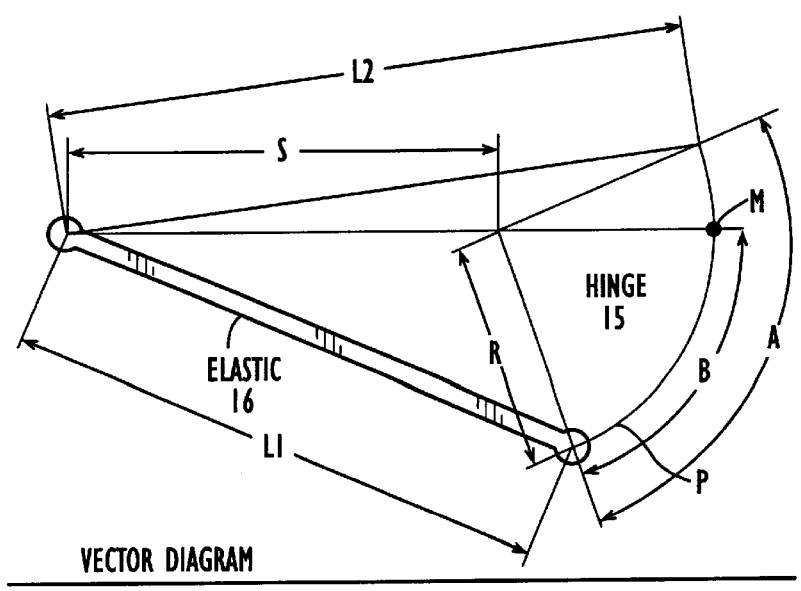
FIG. 2 is a vector diagram that schematically illustrates the relative orientation of the base, clip and spring of the clamping device of FIGS. 1A and 1B when the clip is in open and closed positions.

Referring now to FIG. 2, a vector diagram schematically illustrates the relative orientation of the base 12, clip 14 and spring 16 when the clip 14 is in open and closed positions. The spring 16 has a first length L1 when the clip 14 is in the closed position and a second length L2 when the clip 14 is in the open position. In the illustrated embodiment, the second length L2 is greater than the first length L1. The dimension S is the distance from the point 15 where the clip 14 is pivotally attached to the base 12 to the point where the spring first end portion 16a is attached to the base 12. The dimension R is the distance from the point 15 where the clip 14 is pivotally attached to the base 12 to the point where the spring second end portion 16b is attached to the clip 14.

The vector diagram of FIG. 2 illustrates the path of rotation P that the clip 14 follows between the closed and open positions. The angle A represents the angle between the closed position of the clip 14 and the open position of the clip 14. The angle B is referred to as the "snap angle" and represents the angle at which the force exerted on the clip 14 by the spring 16 changes direction. The point that this force changes direction is the intermediate point M. Between the closed position and the intermediate point M, the spring 16 continuously urges the clip 14 towards the closed position. Between the open position and the intermediate point M, the spring 16 continuously urges the clip towards the open position.

In operation, the illustrated clamping device 10 is fully articulating from zero degrees (0°) and ninety degrees (90°). To remove the clamping device 10 from an article of clothing or an object, a user rotates the electronic device to which the clamping device is utilized away from the user's body or the object using the entire length of the electronic device as a lever arm. By using the electronic device in this manner, the user can obtain a mechanical advantage sufficient to overcome the force of the spring 16. Accordingly, high spring forces can be utilized with the clamping device 10.

When in the open position, the clamping device 10 will remain in the open position until a user exerts a force against the clip 14 to deflect the clip 14 through the snap angle B to the intermediate point M where the clip 14 will snap shut and firmly grip an object or article of clothing. Also, when in the open position, the clamping device 10 can serve as a stand for maintaining an electronic device in a position favorable for hands-free operation.

Figure 3C:
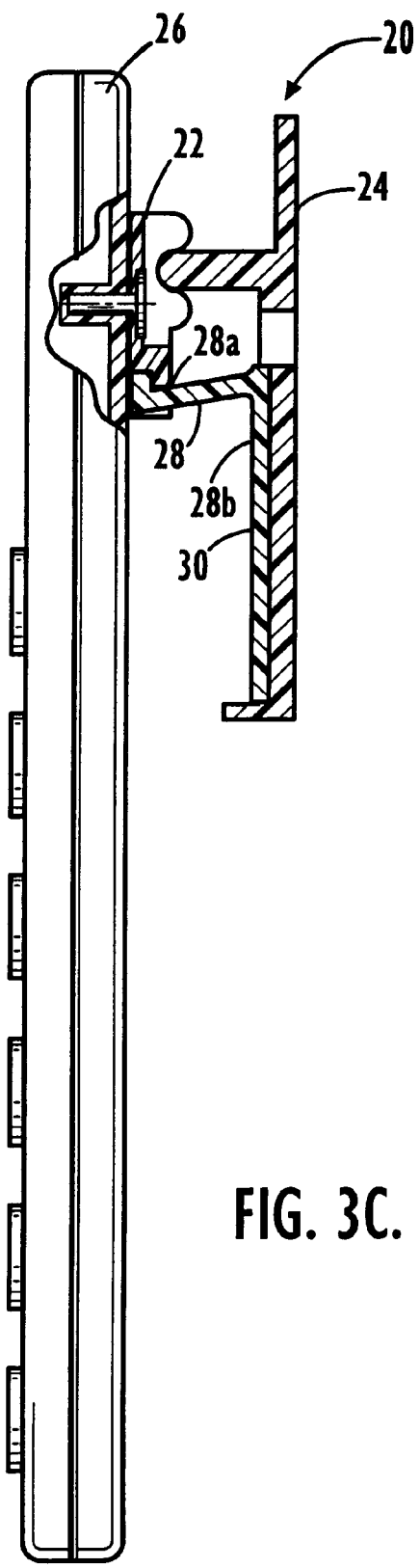
FIG. 3C is a cross-sectional view of the clamping device of FIGS. 3A–3B illustrating the extension spring integrally formed with the clip.

Referring now to FIGS. 3A–3C, a clamping device 20 according to another embodiment of the present invention is illustrated. The illustrated clamping device 20 includes a base 22 and an elongated clip 24 hinged to the base 22. The base 22 is preferably secured to the housing 26 of an electronic device, such as a radiotelephone. The clip 24 is pivotable, relative to the base 24, along a path of rotation between a closed position (FIG. 3A) and an open position (FIG. 3B). In the closed position, the clip 24 is in overlying, adjacent relationship with the base 22 and housing 26, as illustrated in FIG. 3A. In the open position, the clip 24 is disposed at an angle, relative to the base 22 and housing 26, as illustrated in FIG. 3B.

An elastic member 28 having a first end portion 28a secured to the base 22 and an elongated second end portion 28b secured to the clip 24, serves as an extension spring that continuously urges the clip 24 towards the closed position so as to firmly grip an object placed between the clip 24 and the housing 26 and/or base 22. Preferably, the elastic member 28 includes a surface 30 that is configured to frictionally engage an object placed between the clip 24 and the housing 26.

Preferably, the elastic member elongated second end portion 28b is integrally formed with the clip 24 as illustrated in FIG. 3C. For example, the elastic member elongated second end portion 28b may be co-molded with the clip 24. Alternatively, the elastic member first end portion 28a can be co-molded with the base 22.

Figure 4:
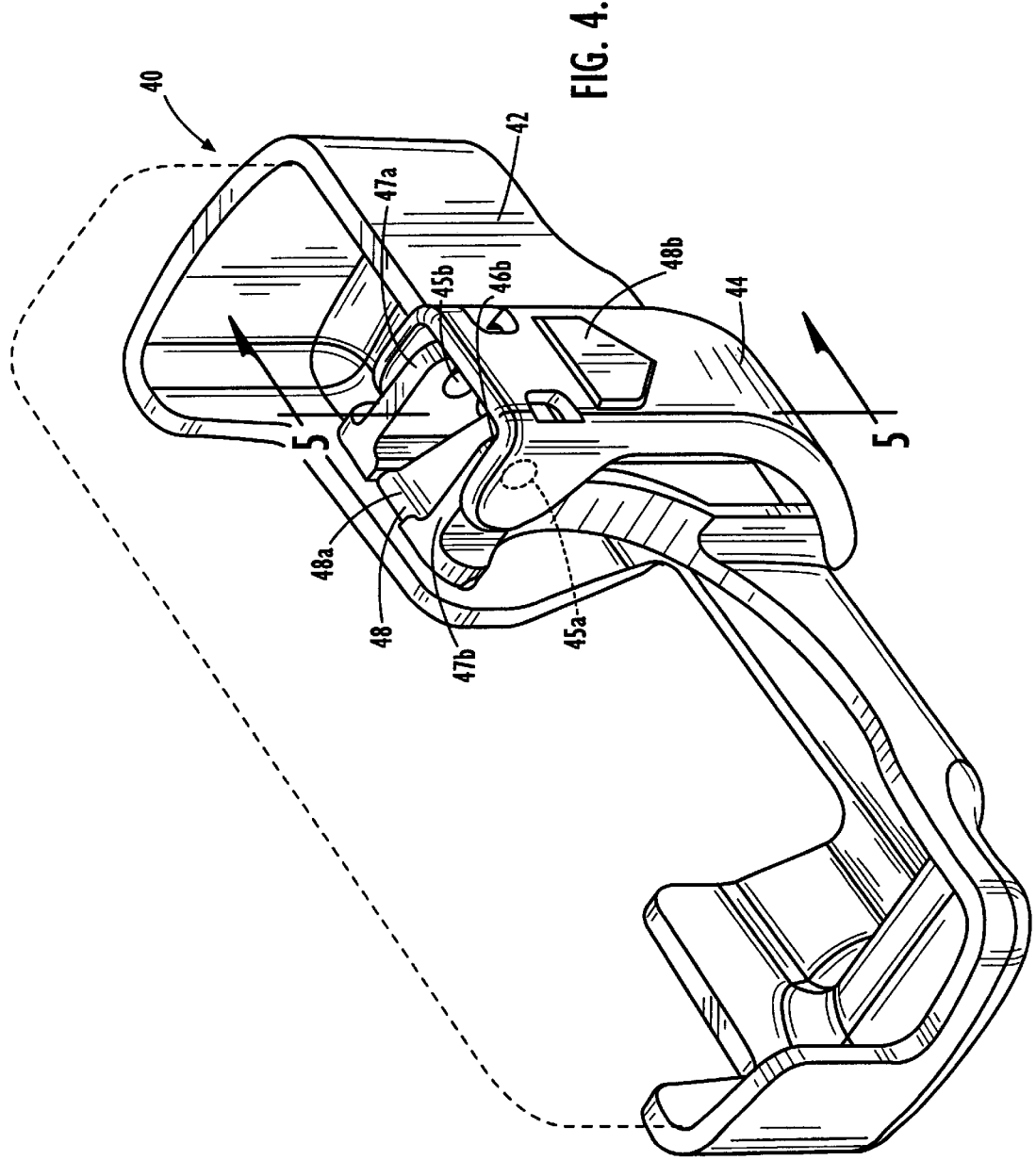
FIG. 4 illustrates a clamping device according to another embodiment of the present invention wherein a holster for an electronic device, such as a radiotelephone, includes a spring-loaded clip hinged thereto.

Referring now to FIGS. 4–6, a clamping device 40 according to another embodiment of the present invention is illustrated. The illustrated clamping device 40 includes a holster 42 and a spring-loaded clip 44 hinged to the holster 42 and pivotable, relative thereto, along a path of rotation between a closed position (FIG. 4) and an open position (FIG. 6). The illustrated holster 42 serves to removably receive an electronic device (not shown), such as a radiotelephone, therewithin.

The illustrated clip 44 includes a pair of bearing studs 45a, 45b that are molded directly therein. Each of the bearing studs 45a, 45b is configured to be received within respective half journals 46a, 46b formed within a pair of hinge arms 47a, 47b extending from the holster 42, as illustrated.

An elastic member 48 includes a first end portion 48a that is coupled to the holster 42 and a second end portion 48b that is secured to the clip 44 and is configured to constantly maintain tension on the clip 44. Depending on the position of the clip 44 relative to the path of rotation, the elastic member 48 is configured to urge or bias the clip 44 towards either the closed or open position. The elastic member 48 continuously urges the clip 44 towards the closed position (FIG. 4) when the clip is positioned between an intermediate point along the path of rotation and the closed position. The elastic member 48 continuously urges the clip 44 towards the open position (FIG. 6) when the clip 44 is positioned between the intermediate point and the open position. When in the open position, the clamping apparatus 40 can also serve as a stand for maintaining an electronic device within the holster 42 in a position favorable for hands-free operation.

Referring now to FIG. 5, a cross-sectional view of the clip 44 and elastic member 48 of FIG. 4 is illustrated. In the illustrated embodiment, a first end portion 48a of the elastic member 48 is coupled to the holster 42 and a second end portion 48b of the elastic member 48 is integrally formed with the clip 44. In the illustrated embodiment, the second end portion 48b of the elastic member 48 extends through an aperture 50 formed within the clip 44.

In addition, the illustrated elastic member 48 includes a portion 52 that has a first surface 52a that is bonded to an inner surface 44a of the clip 44. The illustrated elastic member portion 52 also includes an opposite second surface 52b that includes a plurality of raised portions 53 formed therein that are configured to frictionally engage an object placed between the clip 44 and the holster 42.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An apparatus for supporting a portable electronic device, comprising:
   a base;
   a clip hinged to the base and pivotable, relative to the base, along a path of rotation between a closed position and an open position, wherein the clip is in overlying, adjacent relationship with the base when in the closed position, and wherein the clip is disposed at an angle, relative to the base, when in the open position; and
   a biasing member, secured to the base and to the clip at a fixed location, wherein the biasing member continuously urges the clip towards the closed position when the clip is positioned between an intermediate point along the path of rotation and the closed position, wherein the biasing member continuously urges the clip towards the open position when the clip is positioned between the intermediate point and the open position, and wherein the biasing member remains secured to the clip at the fixed location when the clip is in both the closed and open positions.

2. An apparatus according to claim 1 wherein the biasing member comprises an elongated, elastic member having a first end portion secured to the base and an opposite second end portion secured to the clip at the fixed location.

3. An apparatus according to claim 2 wherein the elastic member has a first length when the clip is in the closed position and a second length when the clip is in the open position, and wherein the second length is greater than the first length.

4. An apparatus according to claim 2 wherein the second end portion of the elastic member is integrally formed with the clip.

5. An apparatus according to claim 2 wherein the first end portion of the elastic member is integrally formed with the base.

6. An apparatus according to claim 2 wherein the elastic member comprises a surface with raised portions formed therein that are configured to frictionally engage an object placed between the clip and the base.

7. An apparatus according to claim 2 wherein the elastic member is formed from an elastomeric polymer selected from the group consisting of synthetic rubber, natural rubber, and polyester.

8. An apparatus according to claim 1 wherein the base comprises an electronic device housing.

9. An apparatus according to claim 1 wherein the base comprises a holster configured to receive an electronic device therewithin.

10. An electronic device, comprising:
    a housing configured to enclose a receiver that receives wireless communication signals;
    a clip hinged to the housing and pivotable, relative to the housing, along a path of rotation between a closed position and an open position, wherein the clip is in overlying, adjacent relationship with the housing when in the closed position, and wherein the clip is disposed at an angle, relative to the housing, when in the open position; and a biasing member, secured to the housing and to the clip at a fixed location, wherein the biasing member continuously urges the clip towards the closed position when the clip is positioned between an intermediate point along the path of rotation and the closed position, wherein the biasing member continuously urges the clip towards the open position when the clip is positioned between the intermediate point and the open position, and wherein the biasing member remains secured to the clip at the fixed location when the clip is in both the closed and open positions.

11. An electronic device according to claim 10 wherein the biasing member comprises an elongated, elastic member having a first end portion secured to the housing and an opposite second end portion secured to the clip at the fixed location.

12. An electronic device according to claim 11 wherein the elastic member has a first length when the clip is in the closed position and a second length when the clip is in the open position, and wherein the second length is greater than the first length.

13. An electronic device according to claim 11 wherein the second end portion of the elastic member is integrally formed with the clip.

14. An electronic device according to claim 11 wherein the first end portion of the elastic member is integrally formed with the base.

15. An electronic device according to claim 11 wherein the elastic member is formed from an elastomeric polymer selected from the group consisting of synthetic rubber, natural rubber, and polyester.

16. An electronic device according to claim 10 wherein the electronic device is a radiotelephone.

17. An apparatus for supporting a portable electronic device, comprising:

a base;

an elongated clip hinged to the base and pivotable, relative to the base, along a path of rotation between a closed position and an open position, wherein the clip is in overlying, adjacent relationship with the base when in the closed position, and wherein the clip is disposed at an angle, relative to the base, when in the open position; and an elastic member having a first end portion secured to the base and an elongated second end portion integrally formed with the elongated clip at a fixed location, wherein the elastic member continuously urges the clip towards the closed position when the clip is positioned between an intermediate point along the path of rotation and the closed position, wherein the elastic member continuously urges the clip towards the open position when the clip is positioned between the intermediate point and the open position, and wherein the elastic member remains secured to the elongated clip at the fixed location when the clip is in both the closed and open positions.

18. An apparatus according to claim 17 wherein the elastic member further comprises a surface with raised portions formed therein that are configured to frictionally engage an object placed between the clip and the base.

19. An apparatus according to claim 17 wherein the elastic member is formed from an elastomeric polymer selected from the group consisting of synthetic rubber, natural rubber, and polyester.

20. An apparatus according to claim 17 wherein the base comprises an electronic device housing.

21. An apparatus according to claim 17 wherein the base comprises a holster configured to receive an electronic device therewithin.

22. An electronic device, comprising:

a housing configured to enclose a receiver that receives wireless communication signals;

a clip hinged to the housing and pivotable, relative to the housing, along a path of rotation between a closed position and an open position, wherein the clip is in overlying, adjacent relationship with the housing when in the closed position, and wherein the clip is disposed at an angle, relative to the housing, when in the open position; and an elastic member having a first end portion secured to the housing and an elongated second end portion integrally formed with the elongated clip at a fixed location, wherein the elastic member continuously urges the clip towards the closed position when the clip is positioned between an intermediate point along the path of rotation and the closed position, wherein the elastic member continuously urges the clip towards the open position when the clip is positioned between the intermediate point and the open position, and wherein the elastic member remains secured to the elongated clip at the fixed location when the clip is in both the closed and open positions.

23. An electronic device according to claim 22 wherein the elastic member further comprises a surface with raised portions formed therein that are configured to frictionally engage an object placed between the clip and the housing.

24. An electronic device according to claim 22 wherein the elastic member is formed from an elastomeric polymer selected from the group consisting of synthetic rubber, natural rubber, and polyester.

* * * * *